US011700320B2

(12) United States Patent
McGraw et al.

(10) Patent No.: US 11,700,320 B2
(45) Date of Patent: Jul. 11, 2023

(54) DATA SHARING IN GEOGRAPHICALLY PARTITIONED NETWORKS

(71) Applicant: PayPal, Inc., San Jose, CA (US)

(72) Inventors: Christopher McGraw, Sunnyvale, CA (US); Mohammed Saleem Shafi, Austin, TX (US); Norihiro Edwin Aoki, Woodside, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/364,685

(22) Filed: Jun. 30, 2021

(65) Prior Publication Data
US 2023/0007093 A1     Jan. 5, 2023

(51) Int. Cl.
*H04L 67/5682* (2022.01)
*H04L 67/306* (2022.01)
*H04L 67/52* (2022.01)
*H04L 67/5683* (2022.01)

(52) U.S. Cl.
CPC ........ *H04L 67/5682* (2022.05); *H04L 67/306* (2013.01); *H04L 67/52* (2022.05); *H04L 67/5683* (2022.05)

(58) Field of Classification Search
CPC ... H04L 67/306; H04L 67/52; H04L 67/5683; H04L 67/5862; G06F 21/6245; G06F 21/6254
See application file for complete search history.

(56) References Cited

U.S. PATENT DOCUMENTS

| 7,860,827 | B1 * | 12/2010 | Ayyad | G06F 16/273 |
| | | | | 707/610 |
| 10,972,556 | B1 * | 4/2021 | Cheng | H04L 67/52 |
| 2015/0235521 | A1 | 8/2015 | Lutnick | |
| 2017/0026343 | A1 | 1/2017 | Wardman | |
| 2018/0276414 | A1 * | 9/2018 | Beckman | G06F 16/9537 |
| 2018/0341896 | A1 * | 11/2018 | Grimes | G06F 3/04817 |
| 2020/0242719 | A1 | 7/2020 | Lee | |

(Continued)

OTHER PUBLICATIONS

International Search Report and Written Opinion in PCT Appl. No PCT/US2022/073200 dated Sep. 19, 2022, 11 pages.

(Continued)

*Primary Examiner* — John M MacIlwinen
(74) *Attorney, Agent, or Firm* — Kowert, Hood, Munyon, Rankin & Goetzel, P.C.; Gareth M. Sampson; Dean M. Munyon

(57) ABSTRACT

Techniques are disclosed for the sharing and transferring of user data in online network systems operating in multiple jurisdictions. The different jurisdictions may be, for example, different geo-partitions in an online network system. Various techniques are disclosed for providing cross-partition operational functionalities (e.g., cross-geo transactions) between geo-partitioned server systems through the sharing and transferring of data between the geo-partitions. The geo-partitions may have established permissions for data that can be shared between the geo-partitions. A server system in one geo-partition may generate an auxiliary account from a subset of data shared across the geo-partitions that complies with the data permissions. Complying with the established data permissions may inhibit overlapping between the different laws or regulations of the geo-partitions.

20 Claims, 6 Drawing Sheets

(56) References Cited

U.S. PATENT DOCUMENTS

| | | | |
|---|---|---|---|
| 2020/0252898 A1* | 8/2020 | Bild | H04W 40/28 |
| 2021/0044658 A1 | 2/2021 | DeLorenzo et al. | |
| 2021/0065164 A1 | 3/2021 | Godfrey et al. | |
| 2021/0097041 A1* | 4/2021 | Patel | G06Q 30/0205 |
| 2022/0172222 A1* | 6/2022 | Chin | G06F 16/214 |

OTHER PUBLICATIONS

Boettcher at al., "The MILS Component Integration Approach to Secure Information Sharing," presented at the 27th IEEE/AIAA Digital Avionics Systems Conference, Oct. 2008, 12 pages.

* cited by examiner

500

502
Transmit, by a first computer system in a first geographic partition of a network, a request to a second computer system in a second geographic partition of the network where the request is for network communication involving a cross-partition operation between a first user and a second user and where the first user is associated with the first, but not the second, geographic partition, and wherein the second user is associated with the second, but not the first, geographic partition.

504
Receive, by the first computer system, account information for the second user from the second computer system where the account information for the second user includes a subset of data for the second user that is authorized to be passed from the second geographic partition to the first geographic partition and where the subset of data for the second user includes a global identifier for the second user that is unique within a set of geographic partitions of the network.

506
Generate, by the first computer system, an auxiliary account for the second user based on the subset of data for the second user where information in the auxiliary account includes the subset of data for the second user and at least one identifier for the auxiliary account that is unique in the first geographic partition.

508
Facilitate, by the first computer system, the cross-partition operation between the first geographic partition and the second geographic partition based on the subset of data for the second user and the at least one identifier for the auxiliary account.

*FIG. 5*

DATA SHARING IN GEOGRAPHICALLY PARTITIONED NETWORKS

BACKGROUND

Technical Field

This disclosure relates generally to methods of communication in online networks, and more particularly to controlling the sharing and transfer of user data between geographically partitioned systems in online networks, according to various embodiments.

Description of the Related Art

Online computer networks are ubiquitous today, providing various different types of services. For instance, online computer networks may provide financial transaction capabilities or other e-commerce associated capabilities such as invoices and agreements. In various implementations, online networks may provide these functionalities across regulatory jurisdictions (e.g., between systems subject to different regulations). Applicant recognizes that there are advantages to limiting the data that is shared in such online networks, and provides solutions discussed below.

BRIEF DESCRIPTION OF THE DRAWINGS

FIG. 5 is a flow diagram illustrating a method for implementing cross-partition operational functionality, according to some embodiments.

Figure 1:
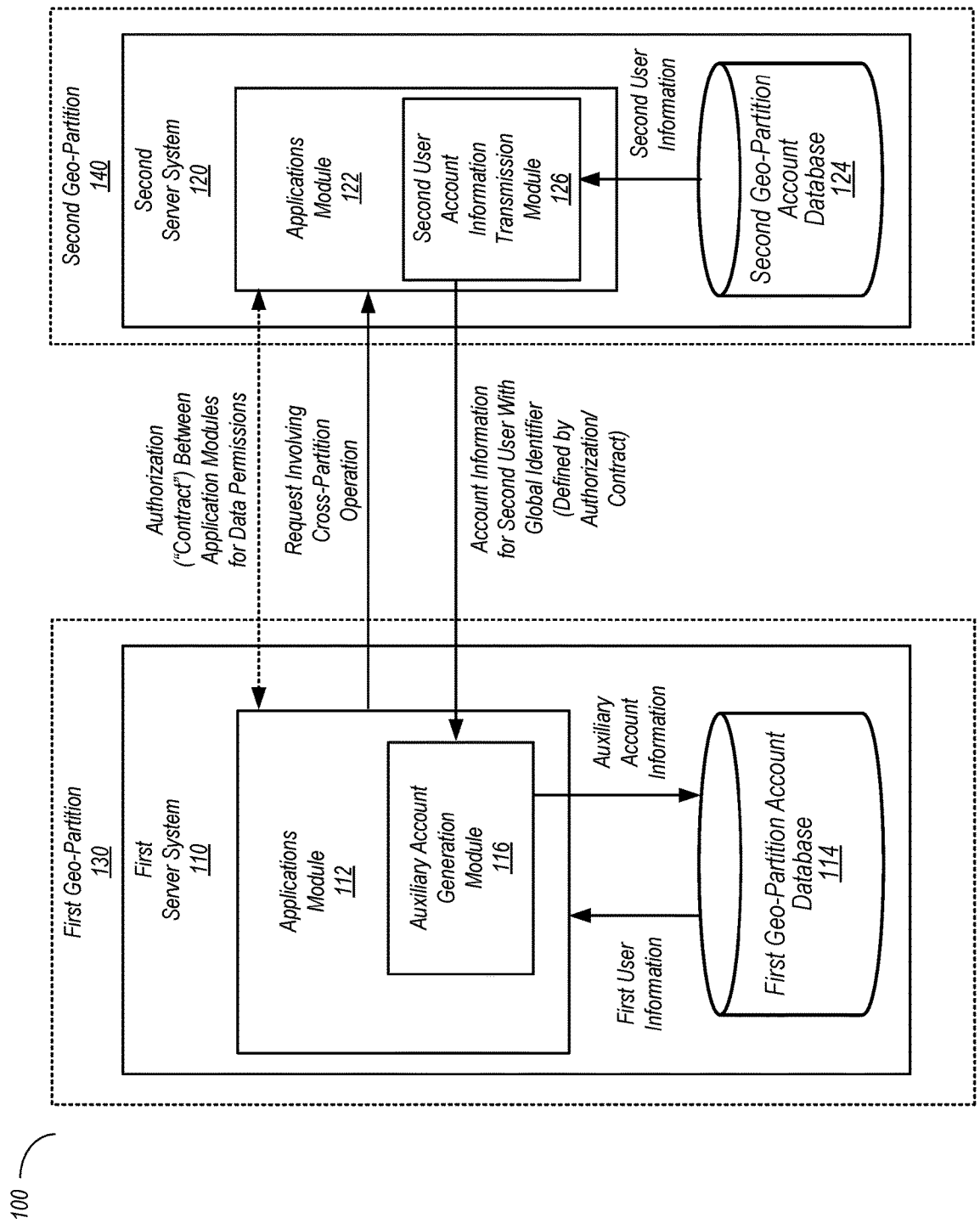
FIG. 1 is a block diagram of an online network system, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION

The present disclosure is directed to various techniques related to the sharing and transferring of user data in online networks (e.g., online network systems) that encompass multiple geographical or jurisdictional areas. Various online network systems (such as a transaction service network system) may operate as a group of interrelated legal entities across multiple jurisdictions. For example, PayPal® or another online service network may operate globally with online systems (such as server systems) localized in or spread across different jurisdictions. A jurisdiction, as used herein, is a geographically-defined area that has a set of laws or regulations that apply to an online system operating in the geographical area. A jurisdiction may include, for example, a legal or regulatory jurisdiction (such as an individual country or a group of countries cooperating according to a treaty or other agreement) or a business jurisdiction (such as an individual business or a group of businesses). An online system (e.g., a payment processing system, a transaction processing system, a customer service system, etc.) may be located or licensed to operate in a jurisdiction. Any operations conducted by the online system may thus be subject to the set of laws or regulations for the jurisdiction as the online system is considered to be a legal entity that is operating within the jurisdiction.

In various embodiments, an online system that is localized in a jurisdiction of an online network system may be considered to be in or part of a geographic partition of the system. As used herein, a "geographic partition" or "geo-partition" is a geographically-defined subdivision of an online network system. For instance, a geo-partition may be a jurisdiction that is geographically-defined within an online network system. As such, an online network system may operate a group of interrelated geo-partitions to provide service functionality in multiple jurisdictions. A geo-partition, as described herein, may include an online system (e.g., legal entity) that operates within the geographically-defined subdivision or jurisdiction as part of the online network system. In some embodiments, online systems are located in different partitions that may or may not be defined geographically. As used herein, a "partition" refers to a subdivision of an online system that operates independently from another subdivision of the online system (e.g., the subdivisions operate as separate legal entities). Thus, partitioned online systems may be online systems that are located in different jurisdictions and are subject to different laws or regulations that are not necessarily geographically defined. For instance, some embodiments may be contemplated where partitioned systems are created for security reasons (e.g., to prevent unwanted sharing of data between partitioned systems).

In online network systems operating with geo-partitioned online systems, a geo-partitioned online system may provide operational functionality for users within the jurisdiction that corresponds to the geo-partition. When an operation (such as a transaction) involves only users within a geo-partition (e.g., the buyer and seller of a product or service are both located in the jurisdiction), the online system is capable of processing the operation using data available locally within the geo-partition or jurisdiction. Thus, the online system may complete the operation according to the laws or regulations for the local jurisdiction without any need for communication with other jurisdictions or other geo-partitions of the online network system.

Online network systems such as PayPal® may, however, also provide functionality for conducting operations (e.g., transactions or customer service operations) across or between geo-partitions (e.g., jurisdictions). Online network systems with operational functionality across geo-partitions allow an online system operating in one geo-partition to conduct and complete an operation that involves another online system in another geo-partition. For example, a first user accessing an online network system through a first online system in a first geo-partition may be able to conduct a transaction that involves a second user accessing the online network system through a second online system in a second geo-partition. In various embodiments, such transactions may be considered cross-partition operations. As used herein, a "cross-partition operation" refers to an operation that takes place between two separate geo-partitions or jurisdictions for the sharing of data or information from one geo-partition to another geo-partition or for one geo-partition to initiate activities or behaviors in another geo-partition. In some embodiments, cross-partition operations may involve transactions referred to as "cross-geo-transactions". As used herein, a "cross-geo transaction" refers to a transaction that takes place between two separate geo-partitions or jurisdictions.

The laws or regulations for each geo-partition (e.g., jurisdiction) may, however, as described above, apply locally to operations being conducted in each geo-partition regardless of the geo-partitions involved in the operation. As such, while the first online system and the second online system may be associated with the same online network system (e.g., PayPal®), the operations conducted by each online system are subject to the laws or regulations of the geo-partition in which the online system is operating. For instance, operations such as data handling (e.g., data storage and retrieval) or data processing (e.g., transaction processing) may be subject to the laws or regulations of the geo-partition in which the operations are being conducted.

In order to complete an operation across geo-partitions, however, data (such as user data) may need to be shared or transferred between the online systems. For example, the first user accessing the online network system through the first online system in the first geo-partition may be attempting to purchase an item from the second user accessing the online network system through the second online system in the second geo-partition. To complete the transaction and allow the first user to purchase the item, the second online system may need data for the first user from the first online system. The data needed may include, for example, name, shipping address information, contact information, or other information needed to complete the transaction. Thus, data for the first user needs to be transmitted from the first online system to the second online system in order for the second online system to be able to complete the transaction.

In such instances, however, data is being shared across geo-partitions (e.g., jurisdictions) that may have different laws or regulations. The present inventors have realized that restrictions may need to be placed on the data that is shareable between geo-partitions. For example, restrictions may be placed on the data that is shareable between geo-partitions to ensure that the local laws or regulations are complied with in each geo-partition and that data processed or stored in one geo-partition is not subject to the laws or regulations of another geo-partition. As such, an operation or transaction may be completed without either online system or the online network system having to determine which laws or regulations to apply to the operation or transaction because any operations that need to comply with a geo-partition's local laws or regulations are completed by the online system in the geo-partition. For example, the first user (buyer) may access the first online system in the first geo-partition to purchase the product and the buyer's portion of the transaction is completed in the first geo-partition while the second user (seller) accesses the second online system in the second geo-partition to complete the purchase with processing of the seller's portion of the transaction is completed in the second geo-partition.

Further, restricting the data shareable between geo-partitions may prevent sensitive information (such as financial instrument information or privacy information) from being shared across geo-partitions. For instance, in the above buyer/seller example, the buyer's financial instrument information is only processed within the first geo-partition and none of the buyer's financial instrument information is shared with the second geo-partition. Preventing sensitive instrument information from being shared across geo-partitions may help prevent the sharing of data that can be used for unauthorized transactions. Additionally, an online network system can maintain or enhance its security and privacy standards by restricting the information shared. Yet further, data privacy laws and/or data-localization regulations in individual geo-partitions may be complied with by restricting the information shared across geo-partitions.

The present disclosure contemplates various techniques for the transferring and sharing of data between online systems in different geo-partitions (e.g., different jurisdictions) while placing restrictions on the data that is shareable between the online systems. Various embodiments disclosed describe that a contract (e.g., an authorization) can be established between online systems in different geo-partitions. A "contract" or "authorization" may refer to an agreement or other communication between the online systems in different geo-partitions that defines the extent of data sharing allowed between the online systems. For instance, the contract may define restrictions on the data that can be shared between the online systems by defining data types that should not be shared. In some embodiments, a contract is established between applications or application programming interfaces ("APIs") located on the online systems in the different geo-partitions. In various embodiments, the contract is established by each online system in each geo-partition associated with the contract determining what data the geo-partition will share with the other. Thus, in such instances, each geo-partition determines the data that the geo-partition shares in compliance with its local laws or regulations.

Various embodiments disclosed further describe the implementation of "auxiliary accounts" for user accounts to allow the sharing of user data according to the contract between online systems in different geo-partitions. As used herein, an "auxiliary account" refers to an account generated in a particular geo-partition where the account is generated from a subset of data shared with the particular geo-partition from the user's home geo-partition. In some embodiments, the shared subset of data, and hence the auxiliary account, includes a minimum representation of the user from the user's home geo-partition that is needed to process a service or transaction in the particular geo-partition generating the auxiliary account. As described herein, the user's "home" geo-partition is the geo-partition in which the data for user's main or primary account is stored. For example, a home geo-partition may be the geo-partition with the online system that stores data for the user's main or primary account. The subset of data may be generated from data in the user's main or primary account.

One embodiment described herein has three broad components: 1) receiving, at a first computer system in a first geo-partition (e.g., a first jurisdiction), account information for a second user from a second computer system of a second geo-partition (e.g., a second jurisdiction) where the account information for the second user includes a subset of data for the second user that is authorized to be passed from the second geo-partition to the first geo-partition, 2) generating, by the first computer system, an auxiliary account for the second user within the first geo-partition where the auxiliary account includes the received subset of data for the second user and at least one unique identifier generated in the first geo-partition, and 3) facilitating the cross-partition operation (e.g., cross-geo transaction) between the first geographic partition and the second geographic partition based on the subset of data for the second user and the at least one identifier for the auxiliary account. In certain embodiments, the subset of data received by the first computer system includes a global identifier for the second user that is unique within a set of geo-partitions of the network. As used herein, the term "global identifier" refers to an identifier for a user that is unique within a set geo-partitions of an online network system. The global identifier, as described herein, may be created in a user's home geo-partition during creation of the user's account in the home-geo-partition. The global identifier may be used to identify and distinguish the user across all geo-partitions of an online system. In some embodiments, the global identifier is an email address for the user. In various embodiments, the first computer system (e.g., the initiator of the request) may complete the cross-partition operation after receiving the subset of data for the second user and generating the auxiliary account information. Additionally, the second computer system may store the auxiliary account information for the second user for subsequent transactions involving the second user that are processed within the first geo-partition. It should be noted, however, that, as described below, the auxiliary account information for the second user may be updated in the instance of another cross-partition operation.

In embodiments described herein, the subset of data for the second user that is shared with the first geo-partition is based on the allowances or restrictions in the contract established between the online systems in the different geo-partitions. The type of information placed in the auxiliary account may depend on what type of user for which the information is being generated. For instance, in a transaction, a user may be a buyer or seller. Examples of information in the auxiliary account for a buyer includes, but is not limited to, name, shipping address, contact information (such as phone number or email address), country code, and a descriptor of the buyer (such as a tier of the buyer or a verification status of the buyer). Examples of information that may be restricted (e.g., excluded) from the auxiliary account for a buyer includes, but is not limited to, home address, date of birth, tax identifier, and financial instruments (such as credit card or bank account information). Examples of information in the auxiliary account for a seller includes, but is not limited to, business name, address, phone number, business industry, country code, and a descriptor of the seller (such as a tier of the seller). Examples of information that may be restricted (e.g., excluded) from the auxiliary account for a seller includes, but is not limited to, login credentials, verification documents, compliance status, tax rates, notification settings, product subscriptions, and owner information.

In short, it can be recognized that benefits exist in restricting the information that is shareable across geo-partitions. An online system in a geo-partition (such as part of a transaction service network system) may generate an auxiliary account from information received from another online system in a different geo-partition where the information received is restricted by a contract or authorization between the online systems. Limiting the information shared between geo-partitions may prevent unwanted sharing of sensitive information for a user (such as financial instrument or privacy data). Additionally, limiting the information shared between two geo-partitions may allow a cross-geo transaction to be processed as two separate transactions within each user's home geo-partition. Each user's home geo-partition may substantially independently fulfill (e.g., process) the transaction for its respective user (e.g., handling payment processing, handling sensitive user information, etc.). In such instances, the information shared across the geo-partitions may be limited to information needed to facilitate (e.g., complete) the cross-geo transaction between the users (e.g., shipping information for a buyer), thus ensuring user sensitive information (e.g., financial instrument information) is kept within a particular user's home geo-partition. Substantially separating the transactions may ensure that laws or regulations for individual geo-partitions are complied with by handling transaction processing largely within a user's home geo-partition.

FIG. 1 is a block diagram of an online network system, according to some embodiments. As used herein, the term "online network system" refers to any system that implements a service over a network in which two or more parties use computer systems to exchange information. Accordingly, a "service" according to this disclosure may include a transaction service, a payment service (e.g., PayPal®), a transportation service, a customer service operation, a media network, a social network, a file transfer service, an online retailer, a dating site, and so on. Note that generally, this disclosure may include various examples and discussion of techniques and structures within the context of an "online network system." Note that all these examples, techniques, and structures are generally applicable to any computer-based system that has a flow of information between different entities. For example, online network system 100 may include any number of online systems that communicate with each other and exchange information for transactions or services between the online systems. However, the term online network system is used for ease of understanding in various portions of this disclosure.

In various embodiments, online network system 100 includes first server system 110 and second server system 120. In the illustrated embodiment, first server system 110 and second server system 120 are online systems (e.g., computer systems) associated with online network system 100. First server system 110 and second server system 120 may be, for example, online servers or other online computer systems associated with online network system 100. In various embodiments, first server system 110 and second server system 120 are partitioned server systems. For example, as described above, first server system 110 and second server system 120 may be online systems operating in different jurisdictions. As first server system 110 and second server system 120 operate in different jurisdictions, in some embodiments, the server systems may operate independently as separate legal entities.

In certain embodiments, first server system 110 and second server system 120 are geo-partitioned server systems in online network system 100. For instance, in the illustrated embodiment, first server system 110 operates or is located in first geo-partition 130 and second server system 120 operates or is located in second geo-partition 140. First geo-partition 130 and second geo-partition 140 may be, for example, separate jurisdictions or subdivisions of online network system 100 that are geographically-defined. Thus, first server system 110 may provide service functionality associated with online network system 100 in first geo-partition 130 and second server system 120 may provide service functionality associated with online network system 100 in second geo-partition 140. It should be noted, however, the illustrated embodiment is provided merely as one non-limiting example and, in other embodiments, an online network system may operate server systems in additional, fewer, or different geo-partitions than those shown in FIG. 1.

In various embodiments, online network system 100 may provide a service operation (e.g., a transaction service or customer service operation) that is utilized by users located in many different geographic areas (e.g., geo-partitions). For example, online network system 100 may use server systems to provide one or more service operations to users that are located across various geo-partitions. Accordingly, online network system 100 may be said to have a global user base. Various data privacy and data-localization regulations (described above), however, may be implemented that require online network system 100 to store a user's data within a geographic area (e.g., geo-partition) in which the user resides or is operating. These requirements may create the need to split online network system 100 into multiple partitions (e.g., first server system 110 in first geo-partition 130 and second server system 120 in second geo-partition 140) working together. In this situation, the individual partitions may only store data for a subset of the user base of online network system 100 (e.g., data for specific customers is only stored in the customers' home partition or geo-partition).

In various embodiments, a partition (e.g., first geo-partition 130 or second geo-partition 140) includes infrastructure to operate as an individual entity. For example, first geo-partition 130 may include infrastructure to operate as a datacenter such as, but not limited to, computer processors, storage hardware, network hardware, and security hardware. Other geo-partitions may have similar infrastructure to allow the different geo-partitions to operate individually and separately. Each set of infrastructure for each geo-partition may thus be dedicated to the customers for the legal jurisdiction associated with the geo-partition. Placing the infrastructures physically within a geo-partition may also allow all data processing and storage to be handled by equipment physically within a user's home geo-partition. While geo-partitions may have similar or replicated infrastructures, the geo-partitions are individualized and independently operated such that one geo-partition may not stand in for (e.g., operate in lieu of) another geo-partition. Thus, geo-partitions may be partitions where all data access is limited to a particular partition and nothing is shared between the partitions except for any cross-geo communications enabled by externalized integrations. The externalized integrations may include, for example, cross-geo functions (such as cross-geo operations or cross-geo transactions) that are facilitated through the use of auxiliary accounts, as described herein.

It should be noted that externalized integrations (e.g., cross-geo operations) between geo-partitions may be implemented through either private or public networks. Various security mechanisms may be implemented in the instances of either private or public networks. For example, encryption mechanisms may be implemented for communication over public networks. Such encryption mechanisms may be available to each geo-partition to allow encryption/decryption as needed. For private or localized networks, encryption mechanisms may be localized to a geo-partition and not shared with other geo-partitions. For embodiments with masking or encryption, tools such as keys or certificates for handling the auxiliary account information may be implemented through the contract between geo-partitions.

In some embodiments, the geo-partitions may be unaware of the existence of other geo-partitions. Thus, one geo-partition may consider another geo-partition as an untrusted party or system. Accordingly, first geo-partition 130 may view second geo-partition 140 as if it were a third-party system (e.g., a system not affiliated with online network system 100) and subject the second geo-partition to similar security or privacy standards. In various embodiments, a geo-partition may securely authenticate and authorize the identity of another geo-partition, for example, through the contract established between the geo-partitions. In some embodiments, the contract may be established through mutual agreement between the geo-partitions. For instance, each geo-partition recognizes another geo-partition as a peer (equal) geo-partition and no single geo-partition has rules or regulations that take precedence over the rules or regulations of another geo-partition.

In the illustrated embodiment, first server system 110 includes applications module 112 and first geo-partition account database 114. Similarly, second server system 120 includes applications module 122 and second geo-partition account database 124. In certain embodiments, applications module 112 and applications module 122 implement software applications that provide functionality for data handling (e.g., data storage and retrieval) or data processing (e.g., transaction processing or customer service processing) for first server system 110 and second server system 120, respectively. In various embodiments, applications module 112 may interact with users via various APIs or web applications to provide functionality for data handling interactions or data processing interactions in first server system 110. Examples of APIs or web applications for interacting with applications module 112 or applications module 122 include, but are not limited to, merchant APIs, customer APIs, distributor APIs, checkout APIs, payment APIs, shipping APIs, or similar web applications. In various embodiments, applications module 112 or applications module 122 implement geo-agnostic software or generic applications.

First account geo-partition database 114 and second geo-partition account database 124 may be databases for storing and maintaining data (e.g., account data) associated with users of online network system 100. First geo-partition account database 114 and second geo-partition account database 124 may include single databases, groups of databases on distributed nodes, databases on a central server, etc. Because of the various data privacy and data-localization regulations described above, first server system 110 may store and maintain data for users that are associated with first geo-partition 130 (e.g., the geo-partition in which the first server system resides or operates) while second server system 120 may store and maintain data for users that are associated with second geo-partition 140 (e.g., the geo-partition in which the second server system resides or operates). As such, even though online network system 100 may be said to logically have one global user base, the online network system utilizes server systems that have access to data for one subset of users but do not have access to data for other subsets of users that are located in different geo-partitions.

In various embodiments, a particular user may have a "home" geo-partition. As used herein, a "home geo-partition" is the geo-partition in which a server system, that stores and maintains account data for a particular user, resides. For instance, geo-partition 130 may be a home geo-partition for a user that has data stored in first geo-partition account database 114 on first server system 110. In certain embodiments, the home geo-partition is established when the user creates his/her account on online network system 100. For example, the home geo-partition may be selected by the user during account creation (such as by selecting a country code for the account). There may, however, be constraints on the selection of the home geo-partition during account creation. For instance, where the user is located geographically or a home or business address of the user may constrain options for selection of a country and the user's home geo-partition during account creation.

After creation of a user account, the user account data stored in a home geo-partition "belongs" to the home geo-partition and handling of the data is subject to the local laws or regulations associated with the home geo-partition. In some embodiments, the laws or regulations for a user's local jurisdiction (e.g., the user's home geo-partition) may apply to the user's data regardless of the location at which the user accesses his/her account. For instance, a user whose home geo-partition is geo-partition 130 may access online network system 100 from a location in geo-partition 140. As the user's home geo-partition is geo-partition 130, the access request and any subsequent processing may be routed to first server system 110 in geo-partition 130. Thus, any services or transactions initiated by the user may be routed to the user's home geo-partition regardless of the location of the user. Accordingly, processing of the request may be subject to the local laws or regulations of the user's home geo-partition because the data is accessed/processed in the home geo-partition.

Additional embodiments may also be contemplated for routing and addressing any services or transactions initiated by a user. For example, in some embodiments, a request from an internet-connected device may be routed to a geo-partition based on the connectivity between the internet service provider (ISP) of the internet-connected device and a specific geo-partition. Thus, the ISP of the user may control where any request is routed within online network system 100. In some embodiments, the request may have information that defines the geo-partition to which the request is to be routed. For example, the request may have a geo-partition specific header or a geo-partition specific IP address.

In various embodiments, online network system 100 provides operational functionality across geo-partitions (e.g., across first geo-partition 130 and second geo-partition 140). Providing operational functionality across first geo-partition 130 and second geo-partition 140 allows first server system 110 and second server system 120 to conduct and complete an operation (e.g., a transaction or service) that involves sharing of data between the server systems. For example, operational functionality may be provided in online network system 100 for a first user accessing the online network system through first server system 110 in first geo-partition 130 to conduct a transaction that involves a second user accessing the online network system through second server system 120 in second geo-partition 140, or vice versa. A transaction that involves a first user associated with first geo-partition 130 and a second user associated with second geo-partition 140 may be referred to as "cross-partition operation" or a "cross-geo transaction", as described herein.

Depicted in FIG. 1 is an embodiment of a cross-geo transaction occurring between first server system 110 in first geo-partition 130 and second server system 120 in second geo-partition 140. The cross-geo transaction involves a first user that has first geo-partition 130 as the first user's home geo-partition and a second user that has second geo-partition 140 as the second user's home geo-partition. In the illustrated embodiment, first server system 110 transmits a request for information involving a cross-partition operation (e.g., the cross-geo transaction) to second server system 120. In various embodiments, the request is made by first server system 110 in response to a request to complete a transaction received by the first server system. It should be noted that while the request to complete the transaction is received by first server system 110, an initial request for the transaction itself may be made by either party involved in the transaction (e.g., a first user or a second user) or by a third-party partner. For example, the initial request for the transaction may be received by either first server system 110 or second server system 120. In either respect, first server system 110 may be tasked with completing the transaction request and making the call for information (e.g., the request) to second server system 120 to get data for the second user needed to complete the transaction. It should also be noted that while FIG. 1 depicts first server system 110 generating the request and completing the transaction, other embodiments may be contemplated where second server system 120 is tasked with completing the transaction and, in response, generates the request.

In certain embodiments, the request includes a request for information about the second user that is needed by first server system 110 to assess or complete a transaction involving the first user having account data in first geo-partition account database 114 and the second user having account data in second geo-partition account database 124. The information needed may include, for example, name, shipping address, contact information, country code, or a descriptor of the first user for the first user. As described above, however, a user's data belongs to his/her home geo-partition and there may be limits on the data that is shareable across geo-partitions due to data privacy or data security regulations. Accordingly, in certain embodiments, restrictions are placed on the data that is shareable between first geo-partition 130 and second geo-partition 140. The restrictions may be put in place to ensure that data handling or data processing in each geo-partition complies with the local laws or regulations for each geo-partition or to prevent sensitive user data (such as financial information) from being shared. For instance, the restrictions may inhibit the laws or regulations for first geo-partition 130 from overlapping with the laws or regulations from second geo-partition 140. Placing the restrictions may also allow first server system 110 in first geo-partition 130 to complete the transaction without having to make any determination of other laws or regulations to apply to the transaction.

In various embodiments, the restrictions for data sharing between first geo-partition 130 and second geo-partition 140 are implemented as an authorization or contract between the first geo-partition and the second-geo partition. In certain embodiments, the contract for data permissions is established by applications module 112 and applications module 122. For example, the contract may be an API contract between applications module 112 and applications module 122. In certain embodiments, the contract implements the restrictions as data sharing permissions between first geo-partition 130 and second geo-partition 140. For example, the contract may define sets or types of data that are permitted to be shared or passed from first geo-partition 130 to second geo-partition 140 or from second geo-partition 140 to first geo-partition 130.

Examples of data that may be shareable between first geo-partition 130 and second geo-partition 140 include, but is not limited to, name, shipping address, contact information (such as phone number or email address), country code, business name, address, phone number, business industry, country code, a descriptor of the buyer (such as a tier of the buyer or a verification status of the buyer), and a descriptor of the seller (such as a tier or verification status of the seller). Examples of data that may be restricted from sharing between first geo-partition 130 and second geo-partition 140 (e.g., not have permission to be shared) include, but is not limited to, home address, date of birth, tax identifier, financial instruments (such as credit card or bank account information), login credentials, verification documents, compliance status, tax rates, IPN settings, product subscriptions, and owner information. In certain embodiments, the sets or types of data that are shareable is dependent on the operation or transaction being conducted. For instance, the sets or types of data that are shareable may be defined by the contract and the needs of the operation or transaction (such as buyer or seller information needed to complete a transaction) at the instance of the operation or transaction.

In some embodiments, the sets or types of data that are permitted to be shared by the contract varies based on the various laws or regulations of the geo-partitions. Accordingly, a contract between first geo-partition 130 and second geo-partition 140 may have different data sharing permissions than a contract between the first geo-partition and a geo-partition other than the second geo-partition. In some embodiments, a contract may be uniformly implemented across multiple geo-partitions. For instance, the contract between first geo-partition 130 and second geo-partition 140 may be used between the first geo-partition and a third geo-partition, a fourth geo-partition, etc.

In the illustrated embodiment of FIG. 1, applications module 112 includes auxiliary account generation module 116 and applications module 122 includes second user account information transmission module 126 ("transmission module 126"). As described above, applications module 112 transmits the request for information about the second user to applications module 122 in order to get the information about the second user needed to complete the transaction. In response to receiving the request, transmission module 126 may retrieve a subset of data for the second user from second geo-partition account database 124. In certain embodiments, the subset of data retrieved includes data for the second user that is needed to complete the transaction in first geo-partition 130 where the subset of data also complies with the data sharing permissions defined by the contract (e.g., authorization) between applications module 112 and applications module 122. Data that is not permitted to be shared according to the contract may not be part of the subset of data retrieved by transmission module 126. Sharing only the subset of data instead of a user's entire account information may better comply with the data sharing permissions defined by the contract between applications module 112 and applications module 122 and prevent the laws or regulations of second geo-partition 140 from spilling over to first geo-partition 130.

In certain embodiments, the subset of data includes a global identifier for the second user. The global identifier, as described above, may be an identifier generated for the second user during creation of the second user's account in second geo-partition 140 that identifies the second user across all or a set of geo-partitions in online network system 100. The global identifier may be, for example, an email address generated by second server system 120 during account creation or an email address added to the account information by the second server system during account creation. In some embodiments, second server system 120 may check with other server systems (e.g., first server system 110) to ensure that the global identifier does not exist elsewhere within online network system 100.

After retrieving the subset of data from second geo-partition account database 124, transmission module 126 may transmit the subset of data (e.g., the account information for the second user permitted to be shared from second geo-partition 140 to first geo-partition 130) to auxiliary account generation module 116 in applications module 112. In various embodiments, auxiliary account generation module 116 generates an auxiliary account for the second user associated with second geo-partition 140 (e.g., the second user's home geo-partition) in response to receiving the account information for the second user. The auxiliary account may be generated to represent the second user's account with the received subset of data for processing in first geo-partition 130. In some embodiments, auxiliary account generation module 116 generates an auxiliary account by modelling second geo-partition 140 as a tenant of first geo-partition 130. Modelling second geo-partition 140 as a tenant for the purposes of generating the auxiliary account enables first geo-partition 130 to distinguish the auxiliary account from local user accounts in first geo-partition 130.

Figure 2:
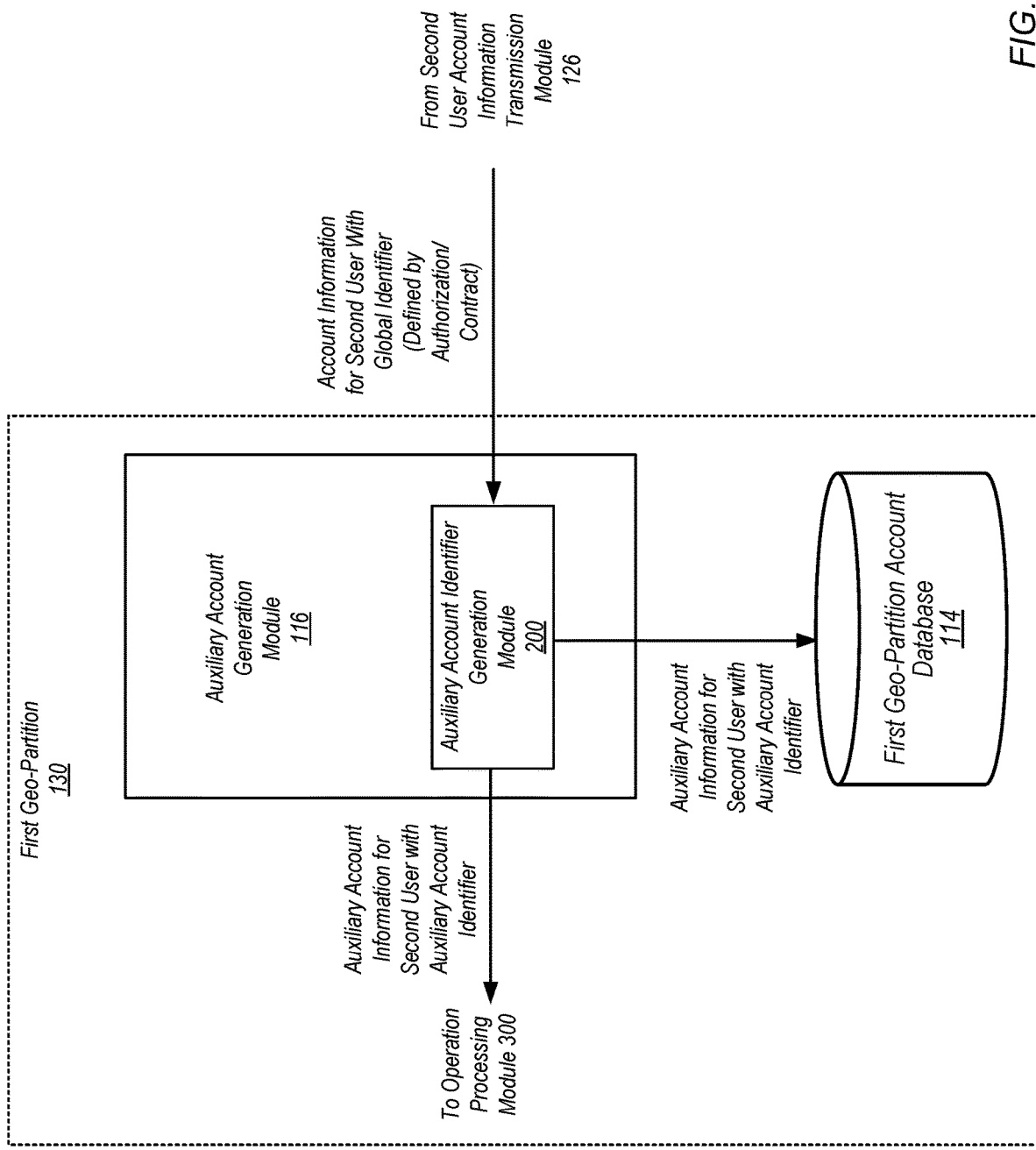
FIG. 2 is a block diagram of an auxiliary account generation module, according to some embodiments.

FIG. 2 is a block diagram of auxiliary account generation module 116, according to some embodiments. In the illustrated embodiment, auxiliary account generation module 116 receives the account information (e.g., subset of data) for the second user from transmission module 126. As described herein, the account information about the second user in second geo-partition 140 (e.g., the second user's home geo-partition) is needed to complete a transaction involving the second user and a first user having account data in first geo-partition 130 (e.g., the geo-partition containing applications module 112).

In the illustrated embodiment, the second user account information is received by auxiliary account identifier generation module 200 in auxiliary account generation module 116. In certain embodiments, auxiliary account identifier generation module 200 generates at least one auxiliary account identifier that is added to the auxiliary account information for the second user. In various embodiments, auxiliary account identifier generation module 200 generates an auxiliary account identifier according to rules associated with user accounts first geo-partition 130. For example, the auxiliary account identifier may be an account number where the auxiliary account number is generated in accordance with account number rules in first geo-partition 130. The auxiliary account identifier added to the auxiliary account information may be used to distinguish the auxiliary account from the first user account and other local accounts in first geo-partition 130. For instance, the auxiliary account number may be unique from account numbers for local users in first geo-partition 130. Examples of identifying information that may be unique for an auxiliary account include, but are not limited to, account number or user identification (such as username). In some embodiments, the auxiliary account information may include a reference to the geo-partition from which the subset of data was received. For example, the auxiliary account information may include the global identifier, which may identify the home geo-partition (second geo-partition 140) of the second user. The global identifier may be included as part of the auxiliary account information for the second user in first geo-partition 130. As another example, the auxiliary account information may include a code or marker that refers back to second geo-partition 140.

In certain embodiments, the auxiliary account identifier for the auxiliary account of the second user is unique from the second user's global identifier and the second user's account identifier in second geo-partition 140. For example, the second user's account may have an account number of 1234 and a global identifier of ABCD@email.com in second geo-partition account database 124 of second geo-partition 140. The global identifier for the second user's account may be shared from second geo-partition 140 to first geo-partition 130 as part of the account information for the second user while the second user's account number is not shared. For instance, the global identifier may be the email address of the second user, which is shareable across geo-partitions. Auxiliary account identifier generation module 200 may generate an auxiliary account number (such as 9876) that is unique in first geo-partition 130 and that is different from the global identifier. As described above, the auxiliary account number of 9876 may be generated in accordance with the rules for user accounts in first geo-partition 130.

In some embodiments, the auxiliary account information includes information that refers the auxiliary account back to the second user account. For example, as described herein, the auxiliary account may include the global identifier, which may be used as an external or public identifier used by the second user account that is shareable across geo-partitions. In some embodiments, the second user account may not receive any information identifying that an auxiliary account exists to maintain the sanctity of user account information stored in second geo-partition account database 124.

Figure 3:
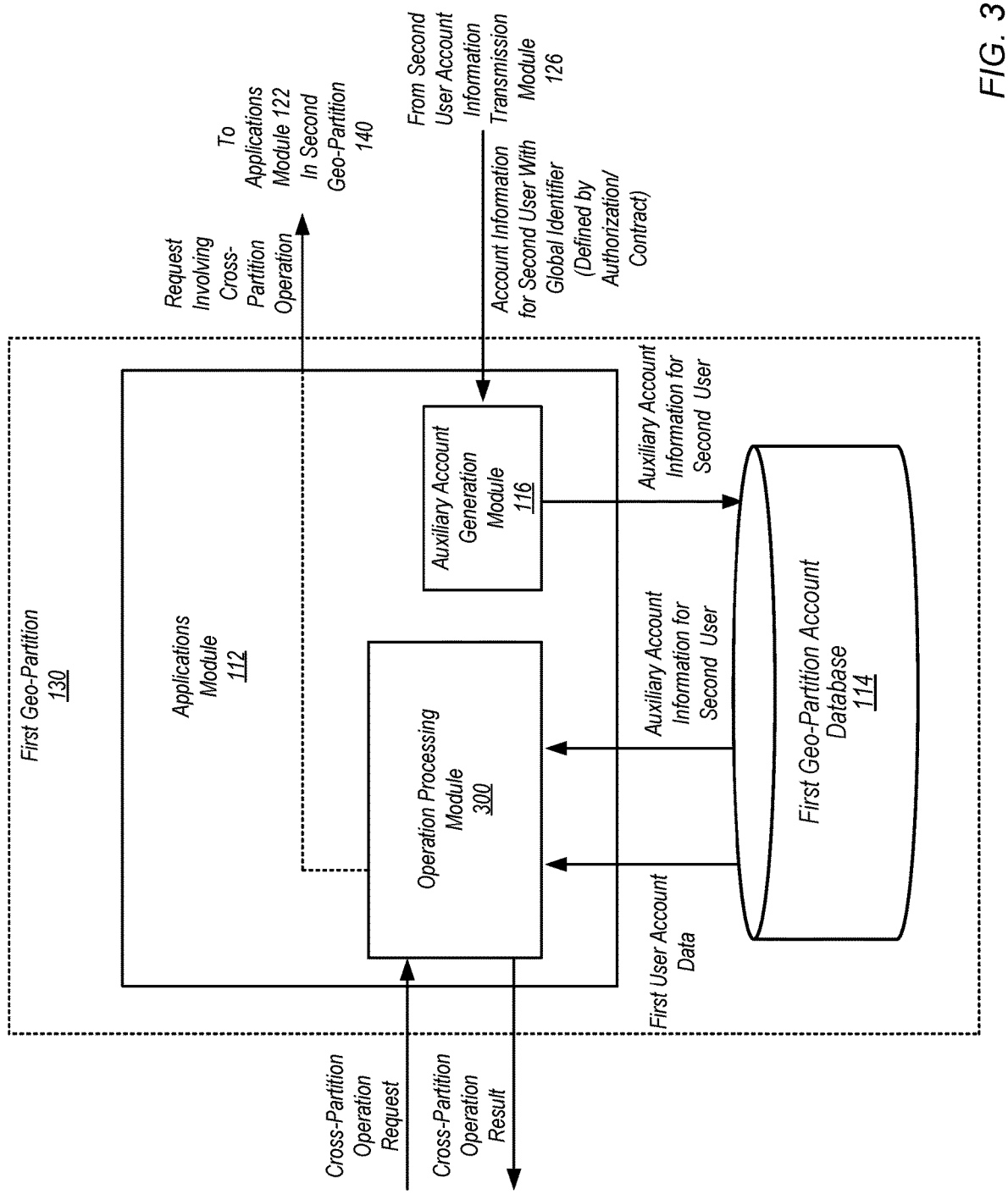
FIG. 3 is a block diagram of an applications module, according to some embodiments.

After the auxiliary account information is generated (where the auxiliary account information includes the generated auxiliary account identifier along with the global identifier), the auxiliary account information may be involved in completing the cross-partition operation (e.g., cross-geo transaction) involving the first user and the second user. FIG. 3 is a block diagram of applications module 112 with operation processing module 300 and auxiliary account generation module 116, according to some embodiments. As described herein, the auxiliary account information for the second user includes information that is needed by operation processing module 300 in applications module 112 to complete the operation involving the first user and the second user. In various embodiments, operation processing module 300 receives the cross-partition operation request for applications module 112 and provides the request for information about the second user to applications module 122 in second geo-partition to initiate the process of receiving the information about the second user and generation the auxiliary account in auxiliary account generation module 116.

In the illustrated embodiment, auxiliary account generation module 116 provides the auxiliary account information to first geo-partition account database 114 for storage and then operation processing module 300 accesses the auxiliary account information for the second user from auxiliary account generation module 116 along with account data (information) for the first user from first geo-partition account database 114. In some embodiments, as shown in FIG. 2, auxiliary account generation module 116 may provide the auxiliary account information directly to operation processing module 300 (with the account data for the first user accessed from first geo-partition account database 114). After accessing the auxiliary account information for the second user and the account data for the first user, operation processing module 300 may determine a result for the cross-partition operation based on the auxiliary account information and the account data for the first user. In certain embodiments, the auxiliary account information is a subset of data that is treated by operation processing module 300 and applications module 112 as regular account information. For instance, no special handling of the auxiliary account information is needed and operation processing module 300 can determine the operation (transaction) result as if the operation was occurring between two accounts in first geo-partition 130. In various embodiments, operation processing module 300 and applications module 112 may be unaware that the auxiliary account information is a subset of data as the auxiliary account includes enough information to complete the transaction.

As long as the information (data) needed by operation processing module 300 to determine an operation result is within the constraints of the data permitted by the contract to be shareable between first geo-partition 130 and second geo-partition 140, operation processing module 300 receives enough information in the auxiliary account information to complete the transaction. In some instances, however, all the information needed by operation processing module 300 to complete the transaction may not be available in the auxiliary account information. For instance, the contract between first geo-partition 130 and second geo-partition 140 may inhibit information that is needed to complete the transaction from being included in the subset of data used to generate the auxiliary account information. As one example, the subset of data may not be able to include full vetting or verification of the second user. In such instances, operation processing module 300 may make a determination to complete the transaction or deny the transaction (e.g., ship a product) based on the auxiliary account information that is available. The determination may be based on, for example, a set of business rules applied by operation processing module 300.

Figure 4:
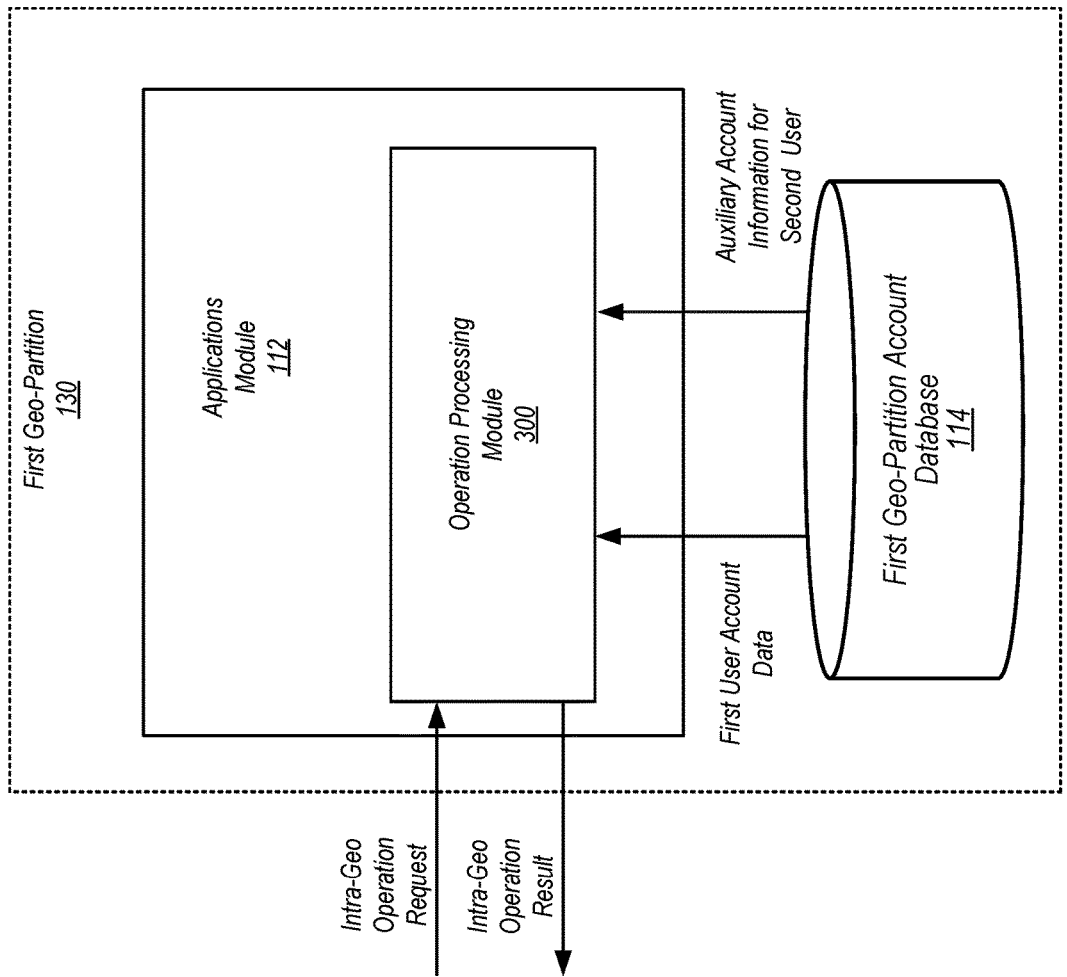
FIG. 4 is a block diagram of a geo-partition, according to some embodiments.

In various embodiments, as shown in FIGS. 1-3, the auxiliary account information for the second user may be stored in first geo-partition account database 114. The auxiliary account information for the second user may be accessed by applications module 112 for subsequent transactions or services involving the second user that are processed within first geo-partition 130. FIG. 4 is a block diagram of first geo-partition 130, according to some embodiments. Depicted in FIG. 4 is an embodiment of a subsequent intra-geo operation (e.g., transaction) involving the second user occurring in first geo-partition 130 after generation of the auxiliary account for the second user. The intra-geo operation may be, for example, a transaction involving only first geo-partition 130 without any cross-geo communication to another geo-partition.

In the illustrated embodiment, operation processing module 300 accesses (e.g., retrieves) both the first user account data and the auxiliary account information for the second user from first geo-partition account database 114 and determines a result for the intra-geo operation in response to a request for the intra-geo operation. In certain embodiments, the intra-geo operation occurs after the initial operation involving the second user in first geo-partition 130. For example, the initial operation involving the second user may be the first of a sequence of transactions involving the second user that are completed by operation processing module 300 in first geo-partition 130. Thus, the auxiliary account information for the second user may be accessed from first geo-partition account database 114 for each of the transactions in the sequence. In some embodiments, the auxiliary account information for the second user is stored temporarily in first geo-partition account database 114. For instance, the auxiliary account information for the second user may be stored temporarily for a predetermined amount of time or a predetermined number of operations. Storing the auxiliary account information temporarily may allow for a number of operations to be completed by operation processing module 300 without having to make additional cross-geo calls to applications module 122.

In certain embodiments, the auxiliary account information is stored in first geo-partition account database 114, as shown in FIGS. 1-3, with the same structure as account information for local accounts (e.g., the first user's account) in first geo-partition 130. Using the same structure for the auxiliary account may enable a wide range of use-cases where the auxiliary account information in first geo-partition 130 is accessed consistently with local account information according to the rules in the first geo-partition. The consistency in access may be advantageous for transitioning non-partitioned systems to the partitioned system described herein without having the need to revamp the existing systems (e.g., first server system 110 or second server system 120).

It should be noted, however, that the auxiliary account information is valid only for the instance of the initial cross-geo transaction as there is no ongoing or continuous cross-geo syncing occurring between the auxiliary account information in first geo-partition account database 114 and the second user account information in second geo-partition account database 124. Additionally, as the auxiliary account information is generated and stored in first geo-partition 130, the auxiliary account information may not be stored in second geo-partition account database 124 and the second geo-partition may be unaware of the auxiliary account's existence. As such, there are no updates made to the auxiliary account information stored in first geo-partition account database 114 until another cross-geo operation involving the second user is conducted between first geo-partition 130 and second geo-partition 140. At the time of another cross-geo operation, the auxiliary account information for the second user may be updated by auxiliary account generation module 116 with any new or changed information. For instance, the auxiliary account information may be updated if there have been changes to the second user's account in second geo-partition account database 124 since the previous cross-geo operation. Any modifications or changes may be made by auxiliary account generation module 116.

In various embodiments, the auxiliary account information stored in first geo-partition account database 114 is inaccessible by a user as a separate account in first geo-partition 130. For example, the auxiliary account information does not include any information that would allow the second user (e.g., the user for which the auxiliary account information was generated) or another user from logging into or accessing applications module 112 or any computer system in first geo-partition 130. Additionally, the auxiliary account information stored in first geo-partition account database 114 may not be counted as a "customer" by applications module 112. For instance, storing the auxiliary account information does not add to any count or other index for additional customers in first geo-partition 130.

As described above, sharing only a subset of data between geo-partitions and generating auxiliary account information allows operations (e.g., transactions or services) to be completed between geo-partitions without sensitive information being shared across the geo-partitions. For example, sensitive information such as financial instrument information may be prevented from being shared across geo-partitions. Preventing financial instrument information from being shared may reduce the likelihood of theft of the financial instrument information that can be used for unauthorized transactions. Accordingly, online network system 100 is able to maintain, or even enhance, the security and privacy standards of the online network system by limiting the data that is shared between geo-partitions through the use of auxiliary account information.

Additionally, as described above, the use of a subset of data for generating auxiliary account information allows the processing and handling of sensitive data (such as financial data) to be localized to a user's home geo-partition. For example, in a contemplated embodiment involving a product purchase cross-geo transaction, a second user (the buyer) in second geo-partition 140 is attempting to purchase a product from a first user (the seller) in first geo-partition 130 and have the product shipped to the second user. In this example, applications module 112 and applications module 122 may interact to attempt to complete the transaction (such as through a shared API). The interaction, however, may not include any sharing of user information between the applications modules. At a certain point during the product purchase transaction, applications module 122 in second geo-partition 140 conducts the processing of payment information for the second user (such as processing credit card information for the second user). Once the payment information is processed and verified by applications module 122, applications module 122 may indicate to applications module 112 that payment has been approved and accepted. Applications module 112 may then determine the information that is needed to complete the transaction (such as name and shipping address information) and make the information request to applications module 122. Applications module 122 then generates and provides the subset of data for the second user, which auxiliary account generation module 116 uses to generate the auxiliary account information to allow completion of the transaction by applications module 112.

The use of subsets of data to share information between geo-partitions may also reduce the need for cross-geo communication between the geo-partitions. For example, an initial request may be routed to the appropriate geo-partition and then any information that needs to be shared between geo-partitions is handled through sharing of the subset of data. Accordingly, latency for completing a transaction may be reduced by the reduction in the number of cross-geo calls that have to be made in order to complete the transaction.

In the above example, the processing of the payment occurs without any financial information being shared between geo-partitions during the cross-geo transaction. Additionally, data privacy laws or data-localization regulations are complied with because of the limitations placed on the sharing of information by the contract between first geo-partition 130 and second geo-partition 140. It should also be noted that the implementation and usage of the subset of data to limit the information shared as defined by a contract between geo-partitions, the generation of the auxiliary account information, and the localization of data processing and handling may also be implemented for many other types of cross-geo operational functionalities contemplated for online network system 100. Examples of additional operational functionalities that may implement the use of auxiliary account information for functionality across geo-partitions include, but are not limited to, customer service operations, transaction history operations, service channel operations, consumer support service operations, reporting operations, data or document management and archive operations, technology operations, and developer tool operations and experiences.

For instance, in various embodiments, online network system 100 may implement a customer service operation that handles customer service requests associated with the online network system. In such embodiments, applications module 112 and applications module 122 may implement customer service applications that are localized in first geo-partition 130 and second geo-partition 140, respectively. In order to handle a customer service request, a customer service application and a customer service representative/agent that may be handling the customer service request typically need access to all of the data for a user's account. For a customer service request for a single customer, the customer service request may be handled and processed within the single customer's home geo-partition (after routing of the request to the home geo-partition). Additionally, a customer service request between multiple customers that have the same home geo-partition may be handled and processed within the home geo-partition for both customers.

For a customer service request that involve multiple customers (e.g., a buyer and a seller) across multiple geo-partitions, however, there may be a need to share information between the geo-partitions in order to handle and process the customer service request. In such instances, the handling and processing of user information may be localized in the geo-partitions with user information only shared through a subset of data used to generate an auxiliary account, as described herein, to complete the customer service request. Sharing data through the subset of data for the customer service request involving multiple geo-partitions and generating the auxiliary account may maintain compliance with local laws or regulations for the geo-partitions as there is no cross-geo database access occurring when using the auxiliary account. Using the auxiliary account in the sharing of information may also enhance security and privacy as there is no direct data access across the geo-partitions. In some embodiments, a customer service agent is audited or monitored during the customer service request interaction to ensure that local laws or regulation are complied with during the interaction.

In various embodiments, notifications provided to a user are generated by the user's home geo-partition. The notification may be generated in the user's home geo-partition regardless of the initiator of the notification. For example, the process for providing a notification (such as an email) intended for a first user (recipient) in first geo-partition 130 may be initiated in second geo-partition 140. The notification may be initiated, for instance, by applications module 122 to indicate completion of a transaction request or customer service request. In order to comply with data sharing permissions, however, the actual notification sent to the recipient is generated in the recipient user's home geo-partition (first geo-partition 130) using information shared by second geo-partition 140 as a subset of data for generating an auxiliary account in first geo-partition 130. Generating the notification in the recipient's home geo-partition allows the full information for the recipient to be accessed in generating the notification. Full access to the user's information within the home geo-partition allows any sensitive information to be referred to in the notification. The sharing of information using an auxiliary account and generating of a notification in the recipient's home geo-partition may be applied in additional systems beyond transaction and customer service systems. For example, any online network system that involves communication between different users in different geo-partitions or jurisdictions may implement the sharing of information across geo-partitions using an auxiliary account in order to generate a notification in the recipient's home geo-partition.

Example Methods

FIG. 5 is a flow diagram illustrating a method for implementing cross-partition operational functionality, according to some embodiments. Method 500 shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 610, described below.

At 502, in the illustrated embodiment, a first computer system of a first geographic partition of a network transmits a request to a second computer system in a second geographic partition of the network where the request is for network communication involving a cross-partition operation between a first user and a second user and where the first user is associated with the first, but not the second, geographic partition, and wherein the second user is associated with the second, but not the first, geographic partition. In some embodiments, the request by the first computer system is transmitted in response to a request by either the first user or the second user. In some embodiments, the first geographic partition has different regulatory requirements than the second geographic partition.

At 504, in the illustrated embodiment, the first computer system receives account information for the second user from the second computer system where the account information for the second user includes a subset of data for the second user that is authorized to be passed from the second geographic partition to the first geographic partition and where the subset of data for the second user includes a global identifier for the second user that is unique within a set of geographic partitions of the network. In some embodiments, the global identifier for the second user is created during generation of the account information for the second user. In some embodiments, the subset of data for the second user authorized to be passed between the first and second geographic partitions includes information needed by the first computer system to facilitate the cross-partition operation. In some embodiments, the subset of data for the second user that is authorized to be passed from the second geographic partition to the first geographic partition does not include sensitive information for the second user.

In some embodiments, the account information for the second user is the account information at a time of the cross-partition operation. In some embodiments, the first computer system transmits an additional request to the second computer system where the additional request is for network communication involving an additional cross-partition operation between the first user and the second user. The first computer system may receive the account information for the second user at a time of the additional cross-partition operation, update the auxiliary account for the second user with the account information for the second user at the time of the additional cross-partition operation, and facilitate the additional cross-partition operation between the first geographic partition and the second geographic partition based on the updated auxiliary account information.

At 506, in the illustrated embodiment, the first computer system generates an auxiliary account for the second user based on the subset of data for the second user where information in the auxiliary account includes the subset of data for the second user and at least one identifier for the auxiliary account that is unique in the first geographic partition. In some embodiments, the at least one identifier for the auxiliary account is generated by the first computer system according to rules for user accounts in the first geographic partition. In some embodiments, the first computer system determines that the second user is a unique user to the first geographic partition based on the global identifier.

At 508, in the illustrated embodiment, the first computer system facilitates the cross-partition operation between the first geographic partition and the second geographic partition based on the subset of data for the second user and the at least one identifier for the auxiliary account. In some embodiments, the first computer system completes the cross-partition operation using the auxiliary account information and account information for the first user within the first geographic partition.

In some embodiments, an authorization is established between the first geographic partition and the second geographic partition that defines data that can be transmitted from the second geographic partition to the first geographic partition. In some embodiments, the subset of data for the second user in the auxiliary account is determined based on the established authorization.

In some embodiments, the auxiliary account information for the second user is stored in an account information database in the first geographic partition. In some embodiments, a result for at least one additional operation in the first geographic partition is determined based on the stored auxiliary account information where the at least one additional operation is not a cross-partition operation.

Example Computer System

Figure 6:
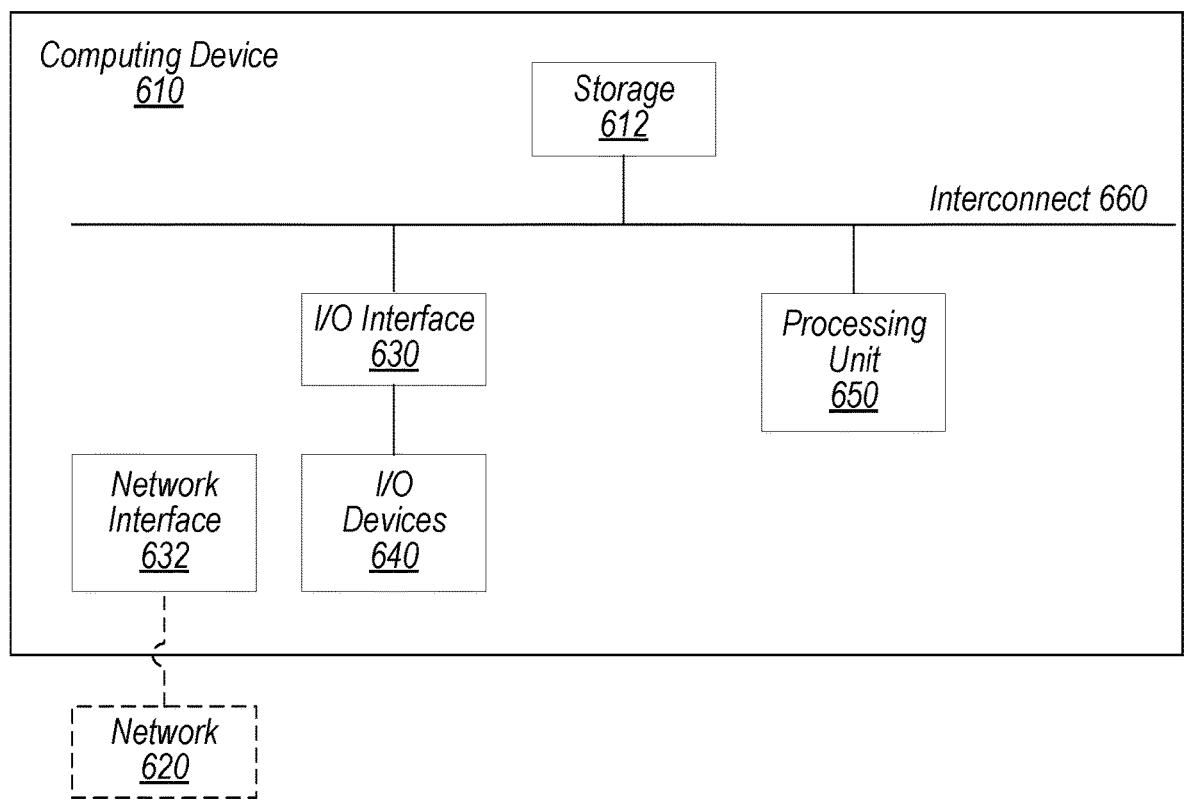
FIG. 6 is a block diagram of one embodiment of a computer system.

Turning now to FIG. 6, a block diagram of one embodiment of computing device (which may also be referred to as a computing system) 610 is depicted. Computing device 610 may be used to implement various portions of this disclosure. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage 612 is usable by processing unit 650 (e.g., to store instructions executable by and data used by processing unit 650). Storage 612 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage 612 may consist solely of volatile memory, in one embodiment. Storage 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    transmitting, by a first computer system in a first geographic partition of a network, a request to a second computer system in a second geographic partition of the network, wherein the request is for network communication involving a cross-partition operation between a first user and a second user, and wherein the first user is associated with the first, but not the second, geographic partition, and wherein the second user is associated with the second, but not the first, geographic partition;
    receiving, from the second computer system, account information for the second user, wherein the account information for the second user includes a subset of data for the second user that is authorized to be passed from the second geographic partition to the first geographic partition, and wherein the subset of data for the second user includes a global identifier for the second user that is unique within a set of geographic partitions of the network;
    generating, by the first computer system, an auxiliary account for the second user based on the subset of data for the second user, wherein information in the auxiliary account includes the subset of data for the second user and at least one identifier for the auxiliary account that is unique in the first geographic partition, the auxiliary account being generated by the first computer system as a temporary account storing the subset of data for the second user needed by the first computer system to complete one or more operations associated with the second user within the first geographic partition; and
    determining, in the first geographic partition by the first computer system, a result for the cross-partition operation between the first geographic partition and the second geographic partition based on the information for the second user in the auxiliary account information and account information for the first user within the first geographic partition.

2. The method of claim 1, further comprising establishing an authorization between the first geographic partition and the second geographic partition that defines data that can be transmitted from the second geographic partition to the first geographic partition.

3. The method of claim 2, wherein the subset of data for the second user in the auxiliary account is determined based on the established authorization.

4. The method of claim 1, wherein the global identifier for the second user is created during generation of the account information for the second user.

5. The method of claim 1, further comprising generating, by the first computer system, the at least one identifier for the auxiliary account according to rules for user accounts in the first geographic partition.

6. The method of claim 1, further comprising completing, by the first computer system, the cross-partition operation using the auxiliary account information and account information for the first user within the first geographic partition.

7. The method of claim 1, further comprising temporarily storing the auxiliary account information for the second user in an account information database in the first geographic partition.

8. The method of claim 7, further comprising determining a result for at least one additional operation in the first geographic partition based on the stored auxiliary account information, wherein the at least one additional operation is an intra-geographic partition operation within the first geographic partition.

9. The method of claim 1, further comprising transmitting the request by the first computer system in response to a request by either the first user or the second user.

10. The method of claim 1, wherein the subset of data for the second user authorized to be passed between the first and second geographic partitions includes information needed by the first computer system to determine the result for the cross-partition operation according to user account rules of the first geographic partition.

11. A computer system, comprising:
a computer processor circuit in a first geographic partition of a network;
a computer-memory storing instructions executable by the computer processor circuit to cause the computer system to perform operations including:
transmitting a request to a second computer system in a second geographic partition of the network, wherein the request is for network communication involving a cross-partition operation between a first user and a second user, and wherein the first user is associated with the first, but not the second, geographic partition, and wherein the second user is associated with the second, but not the first, geographic partition;
receiving, from the second computer system, account information for the second user, wherein the account information for the second user includes a subset of data for the second user that is authorized to be passed from the second geographic partition to the first geographic partition, and wherein the subset of data for the second user includes a global identifier for the second user that is unique within a set of geographic partitions of the network;
generating an auxiliary account for the second user based on the subset of data for the second user, wherein information in the auxiliary account includes the subset of data for the second user and at least one identifier for the auxiliary account that is unique in the first geographic partition, and wherein the auxiliary account is a temporary account inaccessible by users of the computer system that stores the subset of data for the second user, the auxiliary account being accessible by the computer system to complete one or more operations associated with the second user in the first geographic partition; and
facilitating the cross-partition operation between the first geographic partition and the second geographic partition based on the subset of data for the second user and account information for the first user accessible in the first geographic partition.

12. The computer system of claim 11, wherein the account information for the second user is the account information at a time of the cross-partition operation.

13. The computer system of claim 12, wherein the operations include:
transmitting an additional request to the second computer system, wherein the additional request is for network communication involving an additional cross-partition operation between the first user and the second user;
receiving, from the second computer system, the account information for the second user at a time of the additional cross-partition operation;
updating the auxiliary account for the second user with the account information for the second user at the time of the additional cross-partition operation; and
facilitating the additional cross-partition operation between the first geographic partition and the second geographic partition based on the updated auxiliary account information.

14. The computer system of claim 11, wherein the subset of data for the second user that is authorized to be passed from the second geographic partition to the first geographic partition does not include sensitive information for the second user.

15. The computer system of claim 11, wherein the first geographic partition has different regulatory requirements than the second geographic partition.

16. The computer system of claim 11, wherein the operations include determining that the second user is a unique user to the first geographic partition based on the global identifier.

17. A non-transitory computer-readable medium having instructions stored thereon that are executable by a computing device in a first geographic partition of a network to perform operations, comprising:
transmitting a request to a second computing device in a second geographic partition of the network, wherein the request is for network communication involving a cross-partition operation between a first user and a second user, and wherein the first user is associated with the first, but not the second, geographic partition, and wherein the second user is associated with the second, but not the first, geographic partition;
receiving, from the second computing device, account information for the second user, wherein the account information for the second user includes a subset of data for the second user that is authorized to be passed from the second geographic partition to the first geographic partition, and wherein the subset of data for the second user includes a global identifier for the second user that is unique within a set of geographic partitions of the network;
generating an auxiliary account for the second user based on the subset of data for the second user, wherein information in the auxiliary account includes the subset of data for the second user and at least one identifier for the auxiliary account, the at least one identifier being unique within the first geographic partition and different from both the global identifier for the second user and an identifier for the second user in the second geographic partition, wherein the auxiliary account is a temporary account that stores the subset of data for the second user and is accessible in the first geographic partition to complete one or more operations associated with the second user in the first geographic partition; and
facilitating the cross-partition operation between the first geographic partition and the second geographic partition based on the subset of data for the second user and account information for the first user available in the first geographic partition.

18. The non-transitory computer-readable medium of claim 17, wherein the instructions are executable by the computing device to perform operations including establishing authorizations for data being passed from the second geographic partition to the first geographic partition.

19. The non-transitory computer-readable medium of claim 18, wherein establishing the authorizations includes establishing authorizations for data being passed from the first geographic partition to the second geographic partition.

20. The non-transitory computer-readable medium of claim 17, wherein the account information for the second user is received directly from the second computing device.

* * * * *